Figure 1:
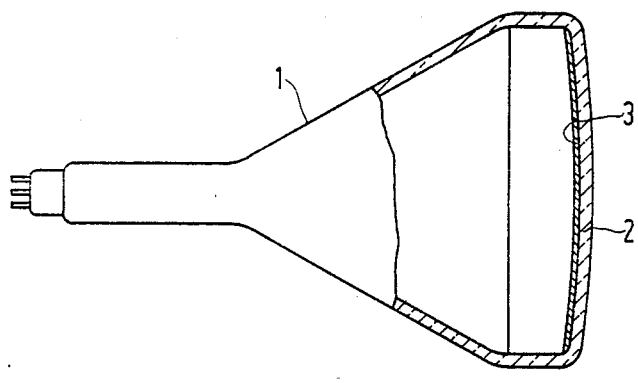

United States Patent [19]

Mutsaers et al.

[11] Patent Number: 4,942,335
[45] Date of Patent: Jul. 17, 1990

[54] BLUE-LUMINESCING LANTHANUM-GADOLINIUM-OXYBROMIDE, LUMINESCENT SCREEN COMPRISING SUCH AN OXYBROMIDE AND CATHODE RAY TUBE PROVIDED WITH SUCH A SCREEN

[75] Inventors: Cornelis A. H. A. Mutsaers; Dagobert M. De Leeuw; Dirk B. M. Klaassen; Cornelis R. Ronda, all of Eindhoven, Netherlands

[73] Assignee: U.S. Philips Corporation, New York, N.Y.

[21] Appl. No.: 305,879

[22] Filed: Feb. 2, 1989

[30] Foreign Application Priority Data

Feb. 3, 1988 [NL] Netherlands .................. 8800254

[51] Int. Cl.$^5$ ............................................. C09K 11/86
[52] U.S. Cl. ......................... 313/468; 252/301.44; 428/691
[58] Field of Search ............... 252/301.44; 428/691; 313/468

[56] References Cited

U.S. PATENT DOCUMENTS 3,617,743 11/1971 Rabatin et al. .............. 252/301.4 H
4,550,256 10/1985 Berkstresser et al. .............. 313/468

FOREIGN PATENT DOCUMENTS 2329396 1/1975 Fed. Rep. of Germany ... 252/301.4 H
61-19688 1/1986 Japan .......................... 252/301.4 H

OTHER PUBLICATIONS

Blasse et al, "J. of Chem. Physics", vol. 51, No. 8, 10/69, pp. 3252–3254.

Primary Examiner—Jack Cooper
Attorney, Agent, or Firm—John C. Fox

[57] ABSTRACT

Blue-luminescing lanthanum-gadolinium-oxybromide, activated by trivalent cerium, which oxybromide is also activated by trivalent terbium and is defined by the molecular formula

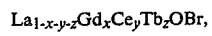
$$La_{1-x-y-z}Gd_xCe_yTb_zOBr,$$

in which
$0.25 \leq x \leq 1-y-z$,
$0.002 \leq y \leq 0.05$,
$0.0001 \leq z \leq 0.005$ and $y \leq z$.

14 Claims, 1 Drawing Sheet

BLUE-LUMINESCING LANTHANUM-GADOLINIUM-OXYBROMIDE, LUMINESCENT SCREEN COMPRISING SUCH AN OXYBROMIDE AND CATHODE RAY TUBE PROVIDED WITH SUCH A SCREEN

The invention relates to a blue-luminescing lanthanum-gadolinium-oxybromide, activated by trivalent cerium. The invention also relates to a luminescent screen comprising such an oxybromide and to a cathode ray tube provided with such a luminescent screen.

A blue-luminescing lanthanum-gadolinium-oxybromide activated by $Ce^{3+}$ is known from Japanese Patent Application published under No. JP-A-61-19688. The molecular ratio between lanthanum and gadolinium is between 0.3 and 25. The quantity of cerium which is present is between 0.1 and 3% by weight. The known oxybromide emits blue $Ce^{3+}$ emission upon cathode ray excitation. As the gadolinium content in the known $Ce^{3+}$-activated oxybromide is higher, the energy efficiency upon cathode ray excitation with which the cathode ray energy is converted into radiation energy is found to be higher. However, it has also been found that the colour point of the emitted radiation is dependent on the molar ratio between La and Gd. At higher values of the Gd content the Y coordinate of the colour point assumes smaller values so that a deeper blue radiation is obtained. This is found to be a drawback in practice, because the colour point is then located outside the region which is prescribed in the so-called EBU standard for the blue-luminescing material for colour television.

The object of the invention is to provide a lanthanum-gadolinium-oxybromide whose colour point can be corrected at an increasing gadolinium content.

According to the invention a blue-luminescing lanthanum-gadolinium-oxybromide, activated by trivalent cerium is characterized in that the oxybromide is also activated by trivalent terbium and is defined by the molecular formula

$$La_{1-x-y-z}Gd_xCe_yTb_zOBr$$

in which
$0.25 \leq x \leq 1-y-z$, $0.002 \leq y \leq 0.05$, $0.0001 \leq z \leq 0.005$ and $y > z$.

It has been found that the lanthanum-gadolinium-oxybromide lattice activated by $Ce^{3+}$ and $Tb^{3+}$ in the said quantities, in which the rare earth metals comprise at least 25 mol. % of gadolinium, emits not only a blue $Ce^{3+}$ emission upon cathode ray excitation, but also a green emission at approximately 550 nm, originating from the $Tb^{3+}$, so that a correction is obtained for a too deep blue emission. It is surprising that there is an increase of the total energy efficiency with which the cathode ray energy is converted into radiation energy. In fact, it was to be expected that the share of green emission, which is less rich in energy, in the essentially blue radiation, would lead to an unacceptable decrease of the energy efficiency. This unexpected increase of the energy efficiency might be explained by the fact that there is an energy transfer from the $^5D_3$-level from the $Tb^{3+}$ to the $Ce^{3+}$ activators. If less than 0.2 mol. % of Ce is present in the lattice, the activator concentration is too low so that the excitation energy cannot be efficiently transferred to the $Ce^{3+}$ ions and too low brightnesses are obtained. In the case of a Ce concentration of more than 5 mol. % the energy efficiency decreases considerably due to concentration quenching. To obtain a measurable influence of the $Tb^{3+}$, at least 0.01 mol. % of Tb must be added. Tb concentrations of more than 0.5 mol. % are not used, because the contribution of the green $Tb^{3+}$ emission, originating from the $^5D_4$-level becomes so large at such high concentrations that the oxybromide can no longer be used as a blue-luminescing phosphor in, for example, a cathode ray tube. For the same reason the Ce content in an oxybromide according to the invention should be larger than the Tb content ($y > z$).

A lanthanum-gadolinium-oxybromide activated by trivalent cerium and trivalent terbium is also known from U.S. Pat. No. 3,617,743. However, this oxybromide comprises larger quantities of Tb, in which the Tb content is at least equal to the Ce content, and it serves as a green-luminescing phosphor. The excitation takes place in the $Ce^{3+}$ in this case. Due to the high Tb concentration and the large Tb/Ce ratio the excitation energy is then substantially transferred to the $Tb^{3+}$ followed by a green $Tb^{3+}$ emission. Such an energy transfer from $Ce^{3+}$ to $Tb^{3+}$ is also described in J. of Sol. State Chem. 37, 267-270, 1981 for the LaOBr lattice.

Tests have proved that it is also possible to obtain a desired colour point shift by co-activation with Eu, Dy, Er, Sm, Pr and/or Ho instead of Tb. However, the energy efficiency then does not increase. There is even a decrease of the energy efficiency so that materials which are not very well suitable for practical applications are obtained. This decrease is caused by the emission of the co-activators, which has a longer wavelength as compared with the emission of the $Ce^{3+}$ activator.

An advantageous embodiment of the lanthanum-gadolinium-oxybromide according to the invention is characterized in that $0.002 \leq y \leq 0.02$. In fact, the energy efficiency of the oxybromide upon cathode ray excitation is bound to be optimum if the Ce concentration is between 0.2 and 2 mol. %.

A practical embodiment of the lanthanum-gadolinium-oxybromide according to the invention is characterized in that $0.0005 \leq z \leq 0.003$. For use in a cathode ray tube it is desirable that the blue-luminescing phosphor has a colour point whose y coordinate is between 0.055 and 0.070 (the so-called EBU standard). The oxybromides comprising at least 25 mol. % of gadolinium can comply with this EBU standard. Dependent on the gadolinium content, between 0.05 and 0.3 mol. % of terbium should be added to the oxybromide.

A preferred embodiment of the lanthanum-gadolinium-oxybromide according to the invention is characterized in that $0.25 \leq x \leq 0.75$ and $0.001 \leq z \leq 0.002$. Blue-luminescing phosphors whose energy efficiency is relatively high as compared with the oxybromides which are only activated by cerium are obtained by adding between 0.1 and 0.2 mol. % of terbium to the oxybromides comprising between 25 and 75 mol. % of gadolinium.

The lanthanum-gadolinium-oxybromide according to the invention may be used for manufacturing a luminescent screen, notably a screen arranged in a cathode ray tube. Since the oxybromides according to the invention can be loaded to a great extent, they are eminently suitable for use in cathode ray tubes with screen loads of more than $0.05W/cm^2$, such as cathode ray tubes for projection television.

The invention will now be described in greater detail with reference to the accompanying drawing and a number of examples.

IN THE DRAWING

Figure 2:
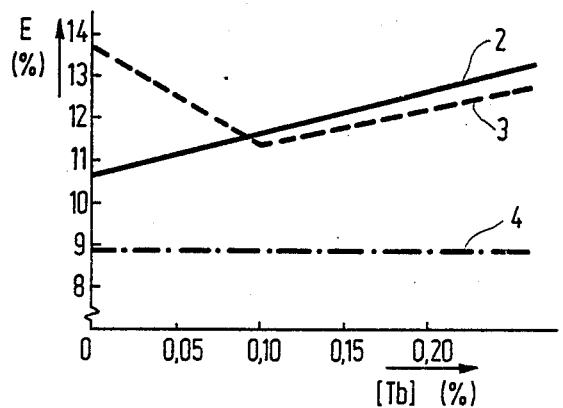
Figure 3:
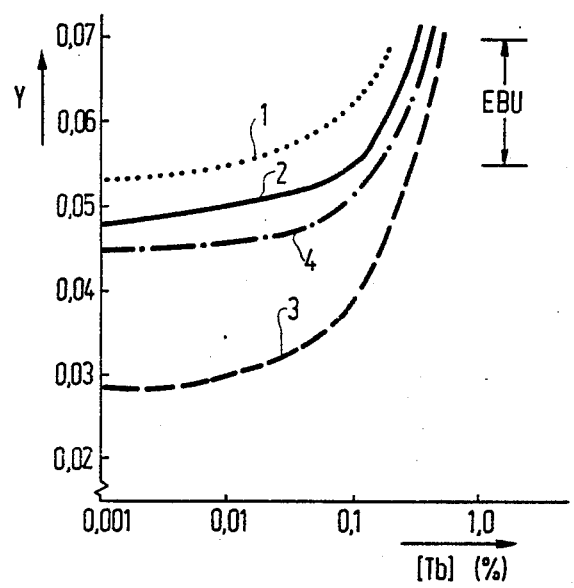

FIG. 1 shows a cathode ray tube having a luminescent screen on which a lanthanum-gadolinium-oxybromide according to the invention is provided, FIG. 2 shows the energy efficiency E upon cathode ray excitation with which the cathode ray energy is converted into radiation energy as a function of the Tb concentration for different oxybromides, and FIG. 3 shows the Y coordinate of the colour point of the emitted radiation of a number of oxybromides as a function of the Tb concentration.

FIG. 1 shows diagrammatically and partly in a cross-section a cathode ray tube for the display of pictures. The tube has an evacuated envelope 1 with a display screen 2 on which a luminescent screen 3 is provided. The screen 3 comprises a blue-luminescing lanthanum-gadolinium-oxybromide according to the invention, activated by trivalent cerium and trivalent terbium.

EXAMPLES 1 TO 6

A lanthanum-gadolinium-oxybromide according to the invention was obtained by mixing the basic materials in oxide form ($La_2O_3$, $Gd_2O_3$, $Ce_2O_3$ and $Tb_2O_3$) in the desired ratio. Subsequently this mixture was heated twice for 1 to 1.5 hours at a temperature of approximately 1100° C. During this heat treatment there was a constant flow of bromine gas. With this method of preparation 6 oxybromides of different compositions were obtained. The Table for these oxybromides shows the formula of the fundamental lattice. It also states with which quantities of Ce and Tb the lattices were activated. The energy efficiency E (in %) upon cathode ray excitation with which the cathode ray energy is converted into radiation energy and the Y coordinate of the colour point of the emitted radiation of these 6 lanthanum-gadolinium-oxybromides are also stated. For the purpose of comparison three lanthanum-gadolinium-oxybromides activated by Ce only were also prepared and measured. These Examples (not according to the invention) are stated in the Table under a, b and c. This Table shows that the addition of terbium to the oxybromide not only causes a shift of the colour point, but also results in an increase of the energy efficiency.

TABLE

| ex. | lattice | Ce(mol. %) | Tb(mol. %) | E(%) | Y |
|---|---|---|---|---|---|
| 1 | $La_{0.7}Gd_{0.3}OBr$ | 1.0 | 0.1 | 12.9 | 0.064 |
| a | $La_{0.7}Gd_{0.3}OBr$ | 1.0 | — | 12.1 | 0.054 |
| 2 | $La_{0.5}Gd_{0.5}OBr$ | 0.5 | 0.1 | 12.3 | 0.054 |
| 3 | $La_{0.5}Gd_{0.5}OBr$ | 1.0 | 0.1 | 12.3 | 0.053 |
| 4 | $La_{0.5}Gd_{0.5}OBr$ | 2.0 | 0.1 | 11.5 | 0.058 |
| 5 | $La_{0.5}Gd_{0.5}OBr$ | 4.0 | 0.1 | 10.6 | 0.067 |
| b | $La_{0.5}Gd_{0.5}OBr$ | 1.0 | — | 10.7 | 0.048 |
| 6 | $La_{0.3}Gd_{0.7}OBr$ | 1.0 | 0.2 | 13.3 | 0.057 |
| c | $La_{0.3}Gd_{0.7}OBr$ | 1.0 | — | 11.6 | 0.039 |

According to the method described a number of oxybromides with different Tb concentrations were obtained. The fundamental lattices of these oxybromides were $La_{0.7}Gd_{0.3}OBr$, $La_{0.5}Gd_{0.5}OBr$ and GdOBr and also $La_{0.5}Y_{0.5}OBr$ (for the purpose of comparison, not according to the invention). These oxybromides were activated by 1 mol. % of Ce. The energy efficiency upon cathode ray excitation, with which the cathode ray energy is converted into radiation energy, and the colour point of the emitted radiation of these oxybromides were measured.

FIG. 2 shows the energy efficiency E (in %) as a function of the Tb concentration for the oxybromides with the fundamental lattices $La_{0.5}Gd_{0.5}OBr$ (2), GdOBr (3) and $La_{0.5}Y_{0.5}OBr$ (4). The energy efficiency for the oxybromide with the fundamental lattice $La_{0.7}Gd_{0.3}OBr$ is not shown, but it substantially coincides with the energy efficiency of the oxybromide with the fundamental lattice $La_{0.5}Gd_{0.5}OBr$. It is to be noted that the energy efficiency of the oxybromide with the fundamental lattice GdOBr decreases if between 0 and 0.1 mol. % of Tb is added. However, if more than 0.1 mol. % of Tb is added, the energy efficiency increases again. Consequently, at relatively high Tb concentrations, there is still a net increase of the energy efficiency. The Figure also shows that addition of Tb in the $La_{0.5}Y_{0.5}OBr$ lattice does not result in an increase of the energy efficiency which is already relatively low.

FIG. 3 shows the Y coordinate of the colour point of the emitted radiation of the oxybromides with the fundamental lattices $La_{0.7}Gd_{0.3}OBr$ (1), $La_{0.5}Gd_{0.5}OBr$ (2), GdOBr (3) and $La_{0.5}Y_{0.5}OBr$ (4) as a function of the Tb concentration. It is found that an increasing Tb content results in an increasing value of the Y coordinate of the colour point for the four fundamental lattices. The Figure also shows the region within which the value of the Y coordinate of the colour point should be in accordance with the EBU standard.

What is claimed is:

1. A blue-luminescing lanthanum-gadolinium-oxybromide, activated by trivalent cerium, characterized in that the oxybromide is also activated by trivalent terbium and is defined by the molecular formula
ti $La_{1-x-y-z}Gd_xCe_yTb_zOBr$, in which
$0.25 \leq x \leq 1-y-z$,
$0.002 \leq y \leq 0.05$,
$0.0001 \leq z \leq 0.005$ and $y > z$ and exhibits a higher energy efficiency upon cathode ray excitation than said oxybromide absent Tb.

2. A luminescent screen comprising a lanthanum-gadolinium-oxybromide as claimed in claim 1 and provided on a carrier.

3. A cathode ray tube provided with a luminescent screen as claimed in claim 2.

4. A lanthanum-gadolinium-oxybromide as claimed in claim 1, characterized in that $0.002 \leq y \leq 0.02$.

5. A luminescent screen comprising a lanthanum-gadolinium-oxybromide as claimed in claim 4 and provided on a carrier.

6. A lanthanum-gadolinium-oxybromide as claimed in claim 4, characterized in that $0.0005 z \leq z \leq 0.003$.

7. A luminescent screen comprising a lanthanum-gadolinium-oxybromide as claimed in claim 6 and provided on a carrier.

8. A lanthanum-gadolinium-oxybromide as claimed in claim 6, characterized in that $0.25 \leq x \leq 0.75$ and $0.001 \leq z \leq 0.002$.

9. A luminescent screen comprising a lanthanum-gadolinium-oxybromide as claimed in claim 8 and provided on a carrier.

10. A cathode ray tube provided with a luminescent screen as claimed in claim 5.

11. A cathode ray tube as claimed in claim 10, suitable for screen loads of more than 0.05 $W/cm^2$.

12. A lanthanum-gadolinium-oxybromide as claimed in claim 1, characterized in that $0.25 \leq X \leq 0.75$ and $0.001 \leq z \leq 0.002$.

13. A cathode ray tube comprising a luminescent screen provided on a carrier, said screen comprising a lanthanum-gadolinium-oxybromide as claimed in claim 12.

14. A lanthanum-gadolinium-oxybromide as claimed in claim 1, characterized in that $0.0005 \leq z \leq 0.003$.

* * * * *